United States Patent
Nagano et al.

(10) Patent No.: US 8,009,970 B2
(45) Date of Patent: Aug. 30, 2011

(54) METHOD FOR ELECTRICALLY ENERGIZING AND HEATING PLATINUM COMPOSITE TUBE STRUCTURE

(75) Inventors: Sei Nagano, Yokohama (JP); Yasuharu Hirabara, Yokohama (JP); Hajime Itoh, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 514 days.

(21) Appl. No.: 11/941,633

(22) Filed: Nov. 16, 2007

(65) Prior Publication Data

US 2008/0083250 A1  Apr. 10, 2008

Related U.S. Application Data

(63) Continuation of application No. PCT/JP2006/306949, filed on Mar. 31, 2006.

(30) Foreign Application Priority Data

May 18, 2005  (JP) .................................. 2005-145439

(51) Int. Cl.
  *H05B 6/54*   (2006.01)
  *H05B 3/60*   (2006.01)
  *C03B 5/225*  (2006.01)
  *C03B 7/06*   (2006.01)
  *C03B 7/07*   (2006.01)

(52) U.S. Cl. ...... 392/323; 65/355; 65/374.12; 219/59.1; 373/36; 392/314; 392/338; 392/480; 392/482

(58) Field of Classification Search .............. 65/374.12, 65/355; 219/59.1, 780; 392/232, 338, 465, 392/478, 479, 480, 482, 314, 323; 313/30, 32; 373/36

See application file for complete search history.

(56) References Cited

U.S. PATENT DOCUMENTS

| | | | | | |
|---|---|---|---|---|---|
| 2,868,378 | A | * | 1/1959 | Burstlein | 209/238 |
| 3,354,292 | A | * | 11/1967 | Kahn | 392/468 |
| 3,364,337 | A | * | 1/1968 | Kahn | 392/468 |
| 3,803,385 | A | * | 4/1974 | Sandorf | 219/499 |
| 6,286,337 | B1 | * | 9/2001 | Palmquist | 65/157 |

FOREIGN PATENT DOCUMENTS

JP   6-227822   8/1994

* cited by examiner

*Primary Examiner* — Matthew J Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

There is provided a method for electrically energizing and heating a platinum or platinum-alloy composite tube structure having a structure including a first main tube, a second main tube, and a branch tube connecting the first main tube and the second main tube, which prevents a local part of the branch tube from being electrically energized and heated in an excessive or insufficient manner.

There is provided a method for electrically energizing and heating a platinum or platinum-alloy composite tube structure having a structure including a first main tube, a second main tube, and a branch tube connecting the first main tube and the second main tube, the method comprising dividing an energizing path for the branch tube into a first energizing path from the first main tube to the branch tube and a second energizing path from the branch tube to the second main tube; and performing energization control for the first energizing path and energization control for the second energizing path independently of each other.

13 Claims, 3 Drawing Sheets

METHOD FOR ELECTRICALLY ENERGIZING AND HEATING PLATINUM COMPOSITE TUBE STRUCTURE

BACKGROUND OF THE INVENTION

1. Field of the Invention

The present invention relates to a method for electrically energizing and heating a platinum or platinum-alloy composite tube structure (hereafter referred to as "the electrical heating method according to the present invention"). In the present invention, the platinum or platinum-alloy composite tube structure includes a structure having two main tubes and a branch tube coupling the main tubes. The two main tubes and the branch tube in the composite tube structure are hollow tubes made of platinum or a platinum alloy. The composite tube structure is used as a conduit for molten glass in a glass manufacturing apparatus, such as a vacuum degassing apparatus. The present invention relates to a method for electrically energizing and heating the composite tube structure, and more specifically, to a method for electrically energizing and heating the branch tube in the composite tube structure.

The present invention also relates to a glass manufacturing method using the electrical heating method according to the present invention.

2. Discussion of Background

Glass manufacturing apparatuses use hollow tubes made of platinum or a platinum alloy, such as a platinum-gold alloy and a platinum-rhodium alloy, as conduits in which high-temperature molten glass flows. The conduits for molten glass include, for example, a tube provided to remove impurities from a glass manufacturing apparatus, a tube provided to supply molten glass from a glass manufacturing apparatus to a mold for forming an optical part, such as a lens or a prism, and a conduit from a melting tank to a forming tank.

In such a glass manufacturing apparatus, the conduits for molten glass are heated 50 that there will be no difference in temperature between the conduits and the molten glass flowing in them. The conduits may be heated externally by heat Sources, such as heaters, but many platinum or platinum-alloy hollow tubes are equipped with electrodes so as to be electrically energized and heated. JP-A-11-349334 discloses a heating apparatus for platinum tubes that can be used as conduits for molten glass.

A composite tube structure 100 shown in FIG. 3 may be used as a conduit for molten glass in a glass manufacturing apparatus. The composite tube structure 100 shown in FIG. 3 includes two main tubes 101 and 102 and a branch tube 103 connecting the main tube 101 and the main tube 102. In order that the main tube 101 of the composite tube structure 100 shown in FIG. 3 is electrically energized and heated, the main tube 101 may have an electrode 200 provided at each of an upper end and a lower end (not shown in the figure) thereof and have the electrodes 200 connected to an external power supply (not shown in the figure) for electrical energization and heating. Similarly, in order that the main tube 102 is electrically energized and heated, the main tube 102 may have an electrode 201 provided at each of an upper end and a lower end (not shown in the figure) thereof and have the electrodes 201 connected to an external power supply for electrical energization and heating.

The branch tube 103 is electrically energized and heated through the main tubes 101 and 102 because of having both ends coupled to the main tubes 101 and 102. More specifically, the branch tube 103 is electrically energized and heated by providing the electrodes 200 and 201 for electrical energization and heating, on the main tubes 101 and 102, connecting the electrodes 200 and 201 to an external power supply (not shown in the figure), and passing a current along an energizing path 300.

When the branch tube 103 is electrically energized and heated in the composite tube structure 100 shown in FIG. 3, energization control must be performed to prevent the branch tube 103 from being locally heated. If electricity is applied along the energizing path 300 in the composite tube structure 100 shown in FIG. 3, a current flows through the shortest path due to its nature. In a junction 104 between the main tube 101 and the branch tube 103, a current concentrates at a corner 104a included in the shortest current path. Similarly, in a junction 105 between the branch tube 103 and the main tube 102, a current concentrates at a corner 105a included in the shortest current path. The corners 104a and 105a where a current concentrates might be locally heated. If the corner 104a or 105a is locally heated, the corner 104a or 105a may be damaged by thermal stress. In addition, the characteristics of molten glass flowing in the composite tube structure 100 could be altered. Therefore, when the branch tube 103 is electrically energized and heated, energization control must be performed to prevent local heating from occurring at the corners 104a and 105a.

When the branch tube 103 is electrically energized and heated, temperature monitoring may be performed at the corners 104a and 105a and at a part other than the corners of the branch tube 103 (hereafter sometimes referred to as the other part), such as a part near the longitudinal center of the branch tube 103, and energization control may be performed in accordance with a difference in temperature between the corners 104a and 105a and the other part. Any difference in temperature between the corners 104a and 105a and the other part indicates that the corners 104a and 105a have been locally heated. In such a case, energization control should be performed to eliminate or reduce the local heating of the corners 104a and 105a. The local heating of the corners 104a and 105a can be avoided or reduced by reducing the electrical heating of the branch tube 103. In the energization control performed for that purpose, either or both of a current flowing there and a voltage applied there should be reduced.

The inventors, however, have found that the electrical heating of the branch tube 103 may be performed inappropriately through the energization control described immediately above (hereafter referred to as the conventional energization control, performed in accordance with a difference in temperature between the corners 104a and 105a and the other part, while, in the hollow tube structure including the main tubes and the branch tube as shown in FIG. 3, electricity is applied between the upper ends of the main tubes or the lower ends of the main tubes).

When the energization control is based on a difference in temperature between the corners 104a and 105a and the other part, the energization control is actually performed in accordance with either a temperature difference $\Delta T_1$ between the corner 104a and the other part or a temperature difference $\Delta T_2$ between the corner 105a and the other part. Since the purpose of the energization control is to prevent the corners 104a and 105a from being locally heated, the energization control is normally performed in accordance with the larger temperature difference, $\Delta T_1$ or $\Delta T_2$.

However, the temperature differences $\Delta T_1$ and $\Delta T_2$ do not necessarily show the same tendency. For example, there may be $\Delta T_1$ alone, or there may be $\Delta T_2$ alone. Alternately, even with both temperature differences $\Delta T_1$ and $\Delta T_2$ being present, the two values may significantly differ from each other.

The temperature differences $\Delta T_1$ and $\Delta T_2$ show different tendencies when temperature rises are caused in different manners at the corners 104a and 105a. If the main tubes 101 and 102 have different diameters, different thicknesses, or different materials, the temperatures of both corners 104a and 105a would rise in different manners even when both tubes are energized through the same energizing path. If a heat source, such as a heater, is close to either the corner 104a or the corner 105a, the temperatures of both corners 104a and 105a would rise in different manners. Therefore, $\Delta T_1$ and $\Delta T_1$ show different tendencies in some cases.

If the temperature differences $\Delta T_1$ and $\Delta T_2$ show different tendencies, there is a possibility electrical energization and heating are inappropriately applied to the branch tube 103 by the conventional energization control. The conventional energization control is performed in accordance with the larger temperature difference, $\Delta T_1$ or $\Delta T_2$, as described earlier. If there is $\Delta T_1$ alone, the energization control would be performed in accordance with $\Delta T_1$. The presence of $\Delta T_1$ means that the corner 104a has been locally heated. The energization control based on $\Delta T_1$ is performed to reduce the electrical heating of the branch tube 103 so that the local heating of the corner 104a is eliminated. Because $\Delta T_2$ is not present in this case, the corner 105a is not locally heated. Under such circumstances, the energization control based on $\Delta T_1$ excessively reduces the electrical heating of the corner 105a. This leads to an is increase in the time required to heat the corner 105a to a desired temperature by electrical energization. At worst, it may be impossible to electrically energized and heat the corner 105a to the desired temperature. If the corner 105a cannot be electrically energized and heated to the desired temperature, there is a possibility that bubbles or deflected streams are formed in molten glass flowing in the composite tube structure 100, adversely affecting the quality of the molten glass.

SUMMARY OF THE INVENTION

It is an object of the present invention to solve the problems described above and to provide a method for electrically energizing and heating a composite tube structure having a structure including two main tubes and a branch tube coupling the main tubes, the method preventing a local part of the branch tube from being electrically energized and heated in an excessive or insufficient manner.

It is another object of the present invention to provide a method for electrically energizing and heating the composite tube structure, which can prevent reboiling (a phenomenon of forming bubbles again) from occurring in molten glass flowing in the composite tube structure or can eliminate such reboiling.

It is another object of the present invention to provide such a method for electrically energizing and heating the composite tube structure, which can prevent molten glass remaining in a dead space of the composite tube structure from getting into molten glass in a main flow or can eliminate such mixing.

It is another object of the present invention to provide a glass manufacturing method using the electrical heating method according to the present invention.

To achieve the objects described above, the present invention provides a method for electrically energizing and heating a platinum or platinum-alloy composite tube structure having a structure including a first main tube, a second main tube, and a branch tube connecting the first main tube and the second main tube. The method comprises dividing an energizing path for the branch tube into a first energizing path from the first main tube to the branch tube and a second energizing path from the branch tube to the second main tube when the branch tube is electrically energized and heated, and performing energization control for the first energizing path and the energization control for the second energizing path independently of each other.

It is preferred in the method of the present invention that the platinum or platinum-alloy composite tube structure be a part of a conduit for molten glass in a glass manufacturing apparatus.

It is preferred in the method of the present invention that the platinum or platinum-alloy composite tube structure be a part of a conduit for molten glass in a vacuum degassing apparatus.

It is preferred in the method of the present invention that the platinum or platinum-alloy composite tube structure be at least one of a conduit disposed on an upstream side and a conduit disposed on a downstream side of a vacuum degassing apparatus.

The present invention also provides a glass manufacturing method using the method according to the present invention.

The present invention further provides an electrically energizing and heating apparatus for a platinum or platinum-alloy composite tube structure having a structure including a first main tube, a second main tube, and a branch tube connecting the first main tube and the second main tube. The apparatus comprises an electrode disposed on the branch tube, for forming a first energizing path to an electrode provided on the first main tube, and another electrode disposed on the branch tube, for forming a second energizing path to an electrode provided on the second main tube, wherein the apparatus performs energization control for the first energizing path and energization control for the second energizing path independently of each other.

The electrical heating method according to the present invention can prevent a local part of the branch tube from being electrically energized and heated in an excessive or insufficient manner when the branch tube included in the composite tube structure is electrically energized and heated. This makes it possible to electrically energize and heat the whole branch tube to a desired temperature without excess or deficiency. In addition, the time required to electrically energize and heat the branch tube to the desired temperature is reduced.

The electrical heating method according to the present invention is suitable for electrically energizing and heating a composite tube structure forming a part of a conduit for molten glass in a glass manufacturing apparatuses, such as a vacuum degassing apparatus.

When the composite tube structure is a part of a conduit for molten glass, the electrical heating method of the present invention has the following additional effects.

Molten glass may remain in a dead space in the composite tube structure, depending on the path of molten glass in the composite tube structure, in some cases. The quality of the molten glass remaining in the dead space has deteriorated in many cases, and if a part of the molten glass remaining in the dead space gets into the molten glass in a main flow, the quality of the molten glass in the main flow could deteriorate. The electrical heating method according to the present invention can prevent molten glass remaining in the dead space of the composite tube structure from getting into the main flow, without lowering the temperature of molten glass on the exit side of the composite tube structure, or can eliminate such mixing. Accordingly, the quality of molten glass flowing in the composite tube structure will not be adversely affected.

When the composite tube structure serves as a conduit on the downstream side of a vacuum degassing vessel in a vacuum degassing apparatus, reboiling (the phenomenon of forming bubbles again) could occur in the molten glass flowing in the composite tube structure under excessive heating or under a reduced pressure. Similarly, when the composite tube structure serves as a conduit on the downstream side of a vacuum degassing apparatus, reboiling could occur in the molten glass flowing in the composite tube structure. The electrical heating method of the present invention can prevent reboiling from occurring in molten glass flowing in the composite tube structure, without lowering the temperature of the molten glass on the exit side of the composite tube structure, or can eliminate such reboiling. Consequently, the amount of bubbles in the molten glass can be reduced, thus preventing an adverse effect on the quality of the molten glass.

When the composite tube structure serves as a conduit on the upstream side of the vacuum degassing vessel in the vacuum degassing apparatus or a conduit on is the upstream side of the vacuum degassing apparatus, the electrical heating method of the present invention has favorable effects. Namely, since molten glass flowing in the composite tube structure will not forms bubbles or deflected streams, the vacuum degassing effects of the vacuum degassing vessel will not be adversely affected.

The glass manufacturing method of the present invention obtains the above-described effects of the electrical heating method of the present invention, and can electrically energize and heat, the whole composite tube structure forming a conduit for molten glass to a desired temperature without excess or deficiency, so that the quality of molten glass flowing in the composite tube structure will not be adversely affected.

DETAILED DESCRIPTION OF THE PREFERRED EMBODIMENTS

Figure 1:
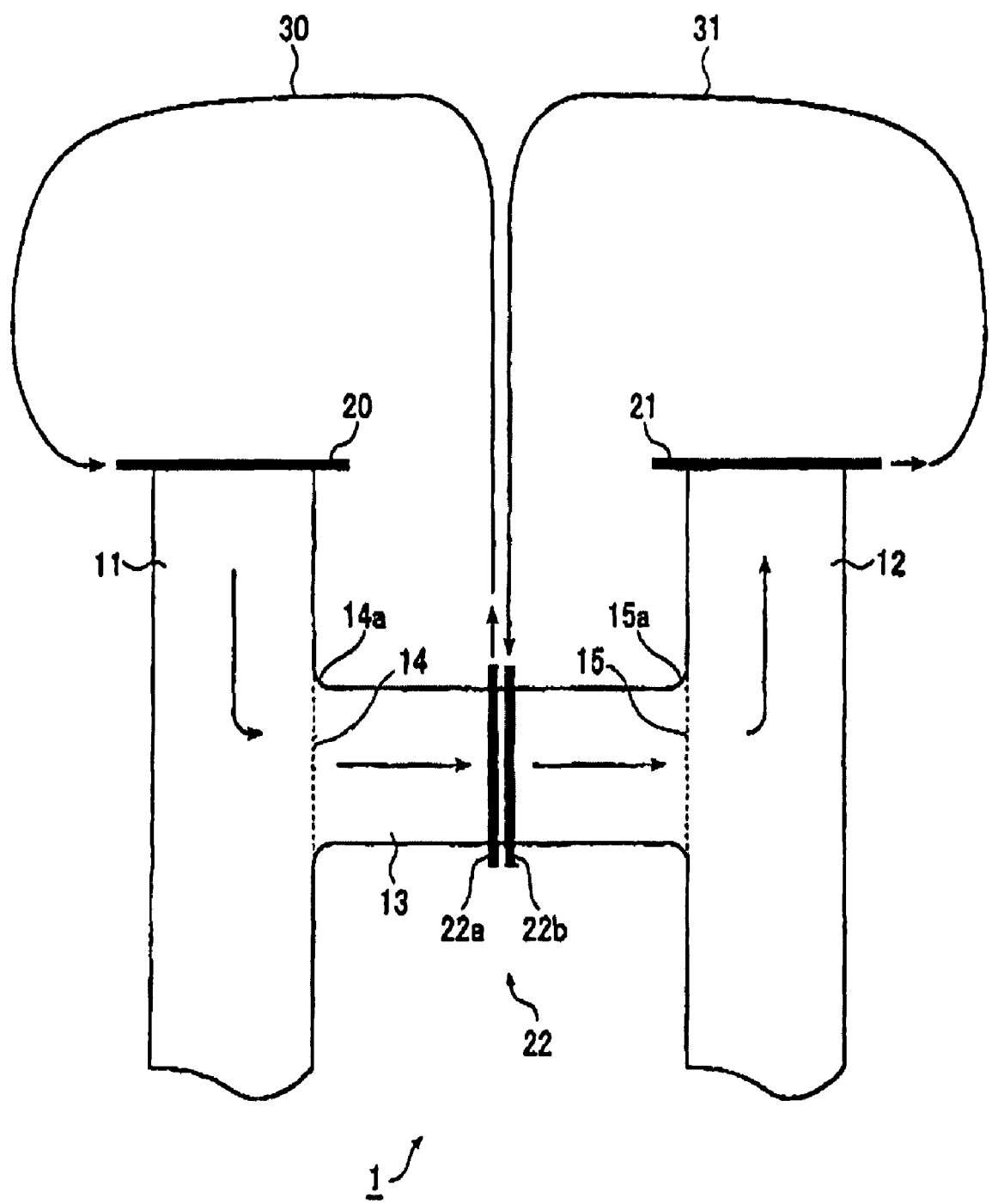
FIG. 1 is a schematic view illustrating a method for electrically energizing and heating the composite tube structure according to an embodiment of the present invention.

The present invention will be described with reference to the drawings. FIG. 1 is a schematic view illustrating an electrical heating method of the present invention and shows a composite tube structure 1 to be electrically energized and heated, according to an embodiment of the present invention. The composite tube structure 1 shown in FIG. 1 includes two main tubes 11 and 12 and a branch tube 13 connecting the main tube 11 and the main tube 12. The main tubes 11 and 12 and the branch tube 13 comprise platinum or platinum-alloy hollow tubes. The platinum alloy may be, for example, platinum-gold alloy or platinum-rhodium alloy. Parts made of platinum or a platinum alloy here include parts made from reinforced platinum produced by dispersing a metal oxide in platinum or a platinum alloy. The metal oxides dispersed here include oxides of metal in group 3, 4, or 13 in the periodic table, such as $Al_2O_3$, $ZrO_2$, and $Y_2O_3$.

In the electrical heating method of the present invention, when the branch tube 13 of the composite tube structure 1 shown in FIG. 1 is electrically energized and heated, the energizing path of the branch tube 13 is divided into a first energizing path from the main tube 11 to the branch tube 13 and a second energizing path from the branch tube 13 to the main tube 12.

In the composite tube structure 1 shown in FIG. 1, the main tubes 11 and 12 have ring electrodes 20 and 21 provided at upper ends thereof. The branch tube 13 also has a ring electrode 22 provided near a central portion thereof in a longitudinal direction thereof. The electrode 22 comprises a two-layer electrode including ring electrodes 22a and 22b. The electrodes 20, 21, and 22 are made of platinum or a platinum alloy and are disposed at outer peripheries of the main tubes 11 and 12 and the branch tube 13. In the composite tube structure 1 shown in FIG. 1, the energizing path from the electrode 20 provided on the main tube 11 to the electrode 22a provided on the branch tube 13 is a first energizing path 30, and the energizing path from the electrode 22b provided on the branch tube 13 to the electrode 21 provided on the main tube 12 is a second energizing path 31.

The electrical heating method of the present invention performs the energization control for the first energizing path 30 and the energization control for the second energizing path 31 independently of each other.

In the composite tube structure 1 shown in FIG. 1, a corner 14a of a junction 14 between the main tube 11 and the branch tube 13 and a corner 15a of a junction 15 between the branch tube 13 and the main tube 12 are included in the shortest paths for a current, and a current flowing through the branch tube 13 concentrates at those corners. There is a possibility that the corners 14a and 15a where a current concentrates are locally heated. Therefore, when the branch tube 13 is electrically energized and heated, the energization control must be performed to prevent each of the corners 14a and 15a from being locally heated.

In the electrical heating method of the present invention, the energizing path of the branch tube 13 is divided into the first energizing path 30 and the second energizing path 31, and the energization control for the first energizing path 30 and the energization control for the second energizing path 31 are performed independently of each other. Accordingly, it is easy to appropriately perform the energization control such that each of the corners 14a and 15a can be protected from local heating.

In order that the energization control is performed to prevent the corners 14a and 15a from being locally heated, temperature monitoring is performed at the corners 14a and 15a and at a part other than the corners of the branch tube 13 (hereafter referred to as the other part), and a temperature difference $\Delta T_1$ between the corner 14a and the other part and a temperature difference $\Delta T_2$ between the corner 15a and the other part are used as the basis of the energization control.

In the electrical heating method of the present invention, the energization control based on $\Delta T_1$ and the energization control based on $\Delta T_2$ can be performed independently of each other, by performing the energization control in the first energizing path 30 in accordance with $\Delta T_1$ and performing the energization control in the second energizing path 31 in accordance with $\Delta T_2$.

To perform the energization control for the first energizing path 30 in accordance with $\Delta T_1$, temperature monitoring may be performed at a part of the branch tube 13 which is other than the corner 14a of the branch tube, and which is in a region from the electrode 20 to the electrode 22a of the first energizing path 30.

To perform the energization control for the second energizing path 31 in accordance with $\Delta T_2$, temperature monitoring may be performed at a part of the branch tube 13, which is other than the corner 15a of the branch tube, and which is in a region from the electrode 22b to the electrode 21 of the second energizing path 31. The other part monitored for $\Delta T_1$ and the other part monitored for $\Delta T_1$ may be different. However, it is preferred that the other part monitored for $\Delta T_1$ and the other part monitored for $\Delta T_2$ have the same temperature as each other, for simplifying the temperature control. Therefore, it is preferred that the other parts be in a single place. Because these conditions can be satisfied by setting the other parts in a single place, the other parts are preferably a place where the electrode 22 of the branch tube 13 is placed. Taking the temperature during heating-up into consideration, the other parts, however, are preferably away from the electrode 22 by a certain distance. The distance between the electrode 22 and the other parts is preferably greater than or equal to 100 mm and less than or equal to 1000 mm in the longitudinal direction of the branch tube 13.

When the branch tube 13 of the composite tube structure 1 shown in FIG. 1 is electrically energized and heated, $\Delta T_1$ and $\Delta T_2$ do not necessarily show the same tendency. If the temperatures at the corner 14a and the corner 15a rise in different manners, $\Delta T_1$ and $\Delta T_2$ show different tendencies in some cases. For example, if the main tube 11 and the main tube 12 have different diameters, different thicknesses, or different materials, the temperatures at the corner 14a and the corner 15a can rise in different manners even when electrical energization is applied even through the same energizing path. If a heat source, such as a heater, is close to either the corner 14a or the 15a, the temperatures at the corners 14a and 15a would rise in different manners. Therefore, $\Delta T_1$ and $\Delta T_2$ show different tendencies in some cases.

For instance, there may be $\Delta T_1$ alone, or there may be $\Delta T_2$ alone. Or, there may be both $\Delta T_1$ and $\Delta T_2$, and the two values may greatly differ from each other. Even if $\Delta T_1$ and $\Delta T_2$ show different tendencies, the electrical heating method of the present invention can control the electrical heating for the corners 14a and 15a appropriately, by performing energization control based on $\Delta T_1$ and energization control based on $\Delta T_2$ independently of each other.

When the energization control based on $\Delta T_1$ and the energization control based on $\Delta T_2$ are performed independently of each other in the electrical heating method of the present invention, the following procedure is performed.

When the branch tube 13 is electrically energized and heated, the presence of $\Delta T_1$ means that the corner 14a has been locally heated. Then, the energization control for the first energizing path 30 is performed to reduce or eliminate the local heating of the corner 14a. To be more specific, the energization control is performed to reduce either or both of the current flowing through the first energizing path 30 and the voltage applied to the first energizing path 30, so that the electrical heating of the corner 14a is reduced. If $\Delta T_2$ is not present under these circumstances, the corner 15a is not locally heated, and the present electrical energization in the second energizing path 31 is kept as it is.

On the contrary, the presence of $\Delta T_2$ means that the corner 15a has been locally heated. The energization control for the second energizing path 31 is performed to reduce or eliminate the local heating of the corner 15a. To be more specific, the energization control is performed to reduce either or both of the current flowing through the second energizing path 31 and the voltage applied to the second energizing path 31, so that the electrical heating of the corner 15a is reduced. If $\Delta T_1$ is not present under these circumstances, the corner 14a is not locally heated, and the present electrical energization in the first energizing path 30 is kept as it is.

If there are both $\Delta T_1$ and $\Delta T_2$, the energization control for the first energizing path 30 and the energization control for the second energizing path 31 are performed independently of each other in accordance with $\Delta T_1$ and $\Delta T_2$ such that the local heating of the corner 14a and the corner 15a is reduced or eliminated.

The electrical heating method of the present invention allows energization control other than the energization control based on $\Delta T_1$ and $\Delta T_2$, described above.

Figure 2:
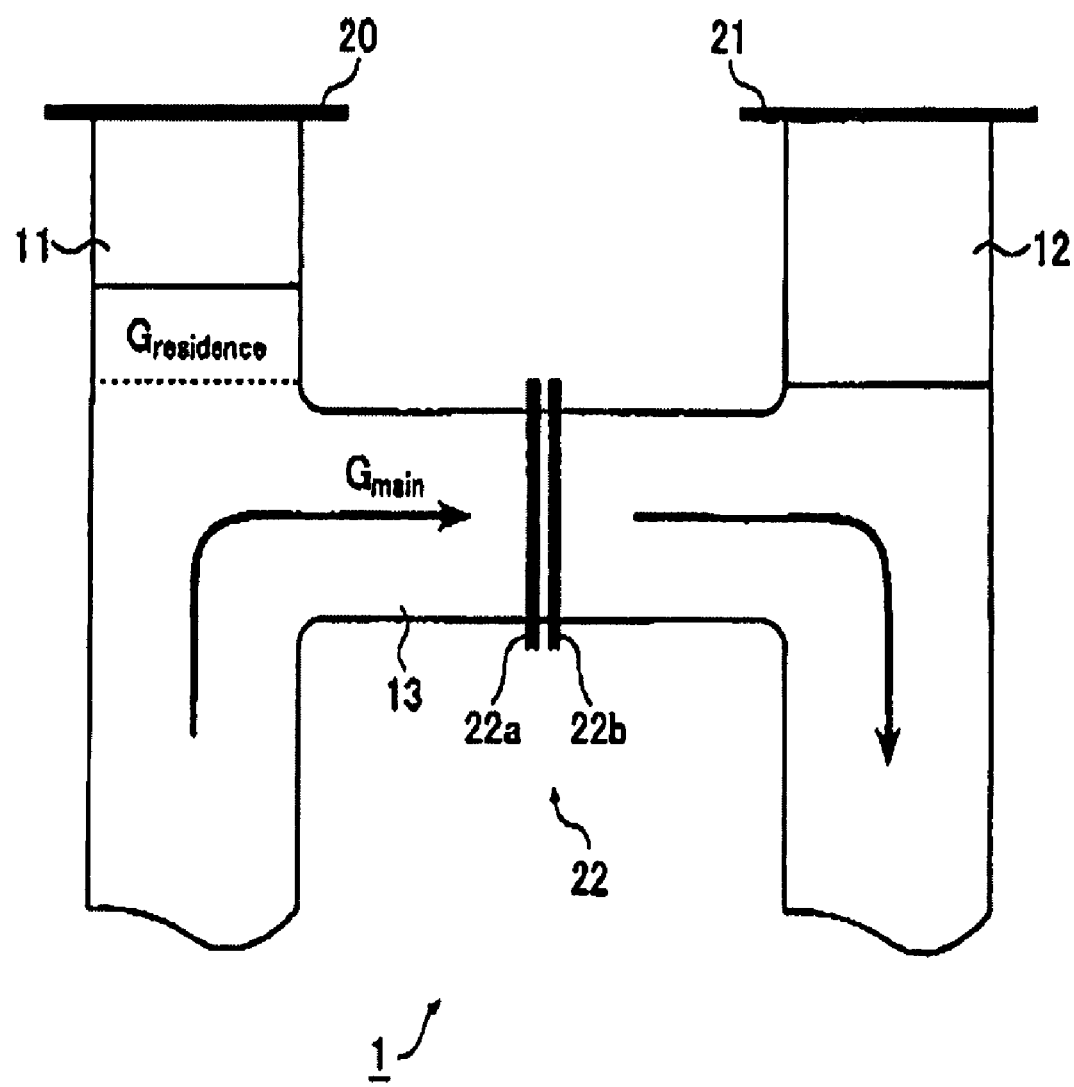
FIG. 2 is a view showing that the composite tube structure shown in FIG. 1 is used as a conduit for molten glass, where the flowing path of molten glass is indicated by arrows in the figure.
Figure 3:
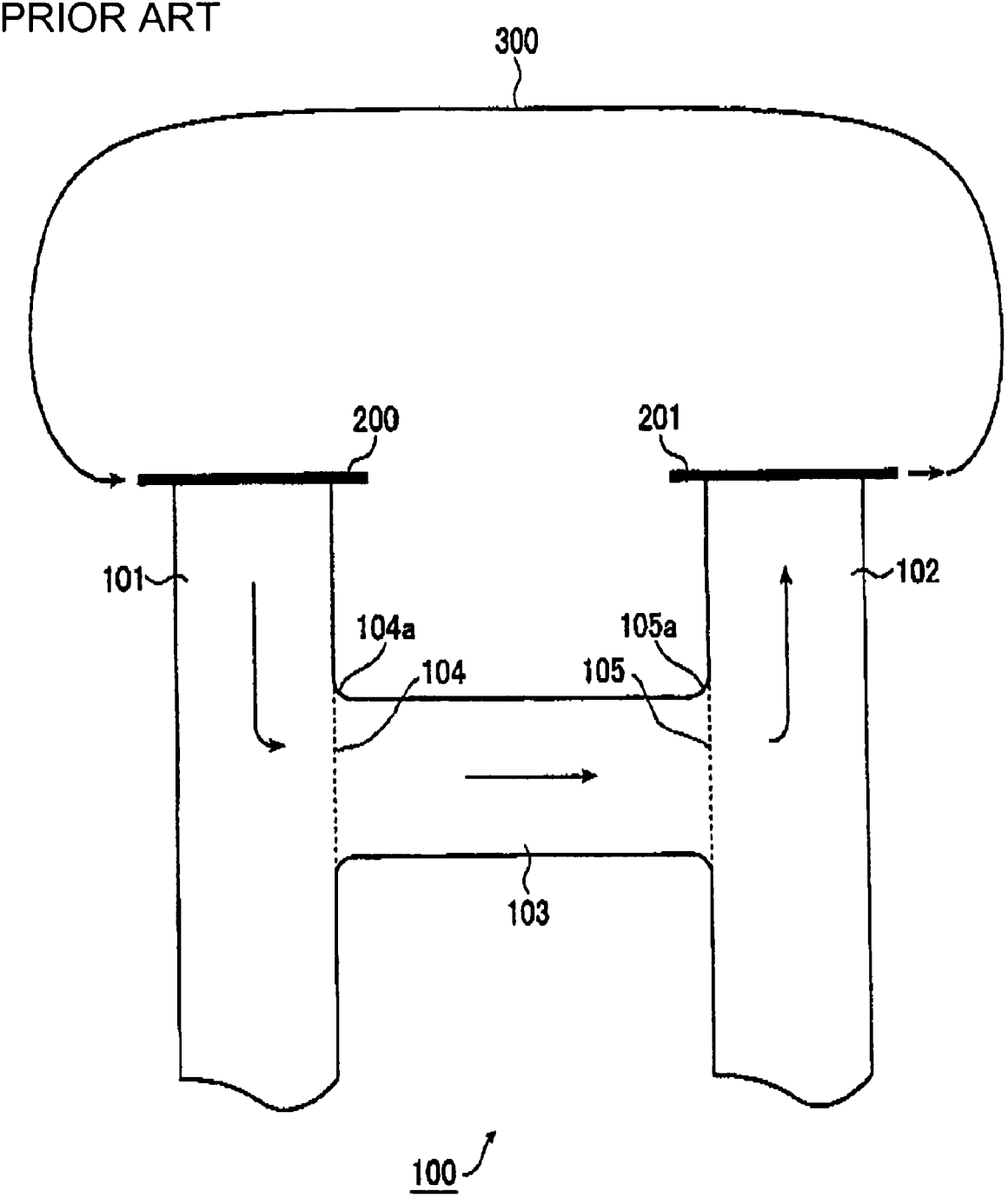
FIG. 3 is a schematic view illustrating conventional energization control to be performed when a branch tube is electrically energized and heated in a composite tube structure including the branch tube.

When the composite tube structure 1 shown in FIG. 1 is used as a conduit for molten glass, molten glass flows along a path indicated by arrows in FIG. 2 in some cases. The composite tube structure 1 shown in FIG. 1 includes the two main tubes 11 and 12 and the branch tube 13 connecting the main tube 11 and the main tube 12. The main tubes 11 and 12 have twig-tube portions at upper ends thereof so as to allow glass to remain in their upper ends.

In this case, a part of molten glass remains as a head (glass head) in a portion (twig-tube portion) near the upper end of the main tube 11 (see $G_{residence}$). In many cases, the quality of the residual part of the molten glass $G_{residence}$ is lower than the quality of molten glass $G_{main}$ flowing in the main flow along the path indicated by the arrows. The residual part of the molten glass $G_{residence}$ should be kept out of the molten glass $G_{main}$ in the main flow, otherwise the quality of the manufactured glass will be lowered. The electrical heating method of the present invention can prevent the residual part of the molten glass $G_{residence}$ from getting into the molten glass $G_{main}$ in the main flow or can eliminate such mixing.

To prevent the residual part of the molten glass $G_{residence}$ from getting into the molten glass $G_{main}$ in the main flow or to eliminate such mixing, the following energization control may be performed.

If an upstream portion of the composite tube structure 1 shown in FIG. 2, i.e., the main tube 11 and a left portion of the branch tube 13, has a high temperature, the viscosity of the residual part of the molten glass $G_{residence}$ decreases, increasing the possibility that the residual part of the molten glass $G_{residence}$ gets into the molten glass $G_{main}$ the main flow. To prevent the residual part of the molten glass $G_{residence}$ from getting into the molten glass $G_{main}$ in the main flow or to eliminate such mixing, it is preferred that the is upstream portion of the composite tube structure 1 be kept at the lowest possible temperature. Therefore, it is preferred that the electrical heating of the branch tube 13 be reduced. However, if the electrical heating of the whole branch tube 13 is reduced, the temperature of the molten glass would be lowered on the exit side of the composite tube structure 1, with the result that the quality of molten glass would be adversely affected.

The electrical heating method of the present invention can prevent the residual part of the molten glass $G_{residence}$ from getting into the molten glass $G_{main}$ in the main flow or can eliminate such mixing, without lowering the temperature of the molten glass on the exit side of the composite tube structure 1, because the energization control for the first energizing path 30 shown in FIG. 1 and the energization control for the second energizing path 31 are performed independently of each other.

To be more specific, the energization control for the first energizing path 30 is performed to reduce the electrical heating, so that the molten glass flowing in the upstream portion of the composite tube structure 1 is kept at the lowest possible temperature. This can prevent the residual part of the molten glass $G_{residence}$ from getting into the molten glass $G_{main}$ in the main flow or can eliminate such mixing. The energization control for the second energizing path 31 is performed to increase the electrical heating. This increases the temperature of the molten glass flowing in the downstream portion of the composite tube structure 1, and the molten glass can be kept at a desired temperature on the exit side of the composite tube structure 1.

If the temperature of molten glass flowing in the composite tube structure 1 is too low, the viscosity of molten glass increases, reducing the liquidity. At worst, molten glass could solidify in the composite tube structure 1. If there is too great a difference in the temperature of molten glass between the upstream portion and the downstream portion of the composite tube structure 1, the temperature of molten glass fails to be uniform, resulting in forming bubbles in the molten glass n some cases.

The temperature of molten glass flowing in the composite tube structure 1 should be appropriately managed. The electrical heating method of the present invention can manage the temperature of molten glass flowing in the composite tube structure 1 appropriately because the energization control for the first energizing path 30 and the energization control for the second energizing path 31 are performed independently of each other.

Whether the residual part of the molten glass $G_{residence}$ has gotten into the molten glass $G_{main}$ in the main flow can be estimated from the composition of manufactured glass. If the residual part of the molten glass $G_{residence}$ has gotten into the molten glass $G_{main}$ in the main flow, there is a strong possibility that the composition of the manufactured glass will not be homogeneous. Whether the residual part of the molten glass $G_{residence}$ has gotten into the molten glass $G_{main}$ in the main flow can be estimated by checking whether the composition of the manufactured glass is homogeneous or not.

If it is estimated from the composition of the manufactured glass that the residual part of the molten glass $G_{residence}$ has been mixed, the mixing of the residual part of the molten glass $G_{residence}$ can be eliminated by performing energization control as described earlier.

When the composite tube structure is a part of a conduit for molten glass in a vacuum degassing apparatus, molten glass flowing in the composite tube structure could reboil. The pressure in the conduit on the downstream side of a vacuum degassing vessel in the vacuum degassing apparatus is lower than the normal pressure because of a reduced pressure in the vacuum degassing vessel. Therefore, molten glass flowing in the conduit could reboil under some temperature or geometry conditions of the conduit. The electrical heating method of the present invention, however, can prevent reboiling from occurring in the molten glass flowing in the composite tube structure or can eliminate such reboiling.

The procedure for preventing reboiling from occurring in molten glass or for eliminating such reboiling by using the electrical heating method of the present invention will be described with reference to FIG. 2, which shows the composite tube structure 1. The composite tube structure 1 shown in FIG. 2 serves here as a conduit of a vacuum degassing vessel, and molten glass flows along the path indicated by the arrows. The internal pressure on the upstream side of the composite tube structure 1 shown in FIG. 2 is lower than the normal pressure under the influence of the vacuum degassing vessel. Accordingly, reboiling could occur in the molten glass flowing in the upstream portion of the composite tube structure 1. The temperature of the molten glass is a factor causing it to reboil. As the temperature of the molten glass increases, the possibility of reboiling increases. Therefore, it is preferred that the upstream portion of the composite tube structure 1 be kept at the lowest possible temperature, so that reboiling in the molten glass can be prevented or eliminated. In other words, it is preferred that the electrical heating of the branch tube 13 be reduced. However, a reduction in the electrical heating of the whole branch tube 13 would lower the temperature of molten glass on the exit side of the composite tube structure 1, and this would adversely affect the quality of the molten glass.

Since the energization control for the first energizing path 30 and the energization control for the second energizing path 31, shown in FIG. 1, are performed independently of each other, the electrical heating method of the present invention can prevent reboiling from occurring in the molten glass flowing in the upstream portion of the composite tube structure 1 or can eliminate such reboiling, without lowering the temperature of the molten glass on the exit side of the composite tube structure 1.

To be more specific, by performing the energization control for the first energizing path 30 so as to reduce the electrical heating so that the upstream portion of the composite tube structure 1 is kept at the lowest possible temperature, reboiling in the molten glass can be prevented or eliminated. In the second energizing path 31, by performing the energization control so as to increase the electrical heating so that the temperature of the composite tube structure 1 is increased in the downstream portion, the temperature of the molten glass is kept at a desired level on the exit side of the composite tube structure 1. Since the internal pressure in the downstream portion of the composite tube structure 1 is higher than that in the upstream portion, a high temperature of molten glass will cause hardly any reboiling.

The composite tube structure, to which the electrical heating method of the present invention is applied, comprises a structure having two main tubes and a branch tube connecting the main tubes. The composite tube structure may include another structure in addition to the structure including the main tubes 11 and 12 and the branch tube 13, as shown in FIG. 1. For instance, the main tubes 11 and/or 12 may be connected to a branch tube other than the branch tube 13. The connected branch tube may extend from a left side of the main tube 11, in the direction opposite to the branch tube 13. Another branch tube extending in the direction opposite to the branch tube 13 may be connected to the right side of the main tube 12.

The branch tube 13 can be connected to any position of the main tubes 11 and 12. The position may be the top, the bottom, or the middle of the main tubes 11 and 12. However, since the effects of the present invention are maximized where $G_{residence}$ exists as stated above, it is preferred that the junction of the branch tube be below the top of the main tube 11 or the main tube 12 by 10 mm or greater, advantageously by 20 mm or greater, or more advantageously by 50 mm or greater. If $G_{residence}$ is present, it is recommended that a stirring member (not shown), such as a stirrer, be provided in the main tube 12 shown in FIG. 1.

The electrode provided on the branch tube 13 need not have a two-layer structure as shown in FIG. 1. The electrode forming a part of the first energizing path and the electrode forming a part of the second energizing path can be independent electrodes so long as they are provided close to each other on the branch tube so that the whole branch tube is electrically energized. Alternatively, a single electrode may be provided to play the roles of the electrode 22a and the electrode 22b.

Although explanation has been made about a case where the present invention is applied to a method for electrically energizing and heating the main tubes 11 and 12 and the branch tube 13, the present invention can also be applied to a composite tube structure including one main vertical tube and two branch tubes provided on the left and right sides of the main tube.

It is preferred that the length of the main tubes 11 and 12 and the branch tube 13 be in the range of 100 to 3,000 mm. It is also preferred that the inner diameter of the main tubes 11 and 12 and the branch tube 13 be in the range of 50 to 1,500 mm. It is further preferred that the wall thickness of the main tubes 11 and 12 and the branch tube 13 be in the range of 0.1 to 3 mm.

In a glass manufacturing apparatus, a stirrer for stirring molten glass is provided in the conduit for molten glass in some case. The electrical heating method of the present invention is also suitable for electrically energizing and heating that type of conduit including such a stirrer. For example, when a stirrer is provided in either or both of the main tubes 11 and 12 in the composite tube structure 1 shown in FIG. 1, the states (temperature, homogeneity, and the like) of molten glass in the upstream portion of the composite tube structure 1 might differ from those in the downstream portion. If molten glass is stirred by the stirrer provided in the main tube 12, it is expected that molten glass flowing in the downstream portion of the composite tube structure 1 is homogeneous.

On the contrary, molten glass flowing in the upstream portion of the composite tube structure 1 is not be homogeneous in some circumstances. Under those circumstances, the temperature of molten glass in the upstream portion of the composite tube structure 1 differs remarkably from that in the downstream portion in some cases. Since molten glass flowing in the upstream portion of the composite tube structure 1 is not homogeneous, the temperature is not uniform in some cases.

By performing the energization control for the first energizing path 30 and the energization control for the second energizing path 31 independently of each other, the electrical heating method of the present invention can control the electrical heating of the composite tube structure 1 so that molten glass can be kept at an appropriate temperature under any circumstances, even if the states of molten glass flowing in the upstream portion differ from those in the downstream portion of the composite tube structure 1.

Since the electrical heating method of the present invention can electrically energize and heat the whole branch tube included in a composite tube structure to a desired temperature without excess or deficiency, this method can be used to electrically energize and heat a conduit for molten glass in a glass manufacturing apparatus, such as a vacuum degassing apparatus.

The entire disclosure of Japanese Patent Application No. 2005-145439, filed on May 18, 2005, including the specification, claims, drawings and summary, is incorporated herein by reference.

What is claimed is:

1. A method for electrically energizing and heating a tube structure, the method comprising:
providing a tube structure made of one of platinum and a platinum-alloy composite tube structure comprising a first main tube, a second main tube, and a branch tube connecting the first main tube and the second main tube;
providing a first main tube electrode on the first main tube and a second main tube electrode on the second main tube;
providing a first branch tube electrode on the branch tube and corresponding to the first main tube electrode, and providing a second branch tube electrode on the branch tube and corresponding to the second main tube electrode, such that an energizing path for the branch tube is divided into a first energizing path from the first main tube to the branch tube and a second energizing path from the branch tube to the second main tube; and
performing energization control for the first energizing path and energization control for the second energizing path independently of each other.

2. The method according to claim 1, further comprising providing the tube structure into a part of a conduit for molten glass in a glass manufacturing apparatus.

3. The method according to claim 1, further comprising providing the tube structure into a part of a conduit for molten glass in a vacuum degassing apparatus.

4. The method according to claim 1, further comprising providing the tube structure into at least one of a conduit disposed on an upstream side and a conduit disposed on a downstream side of a vacuum degassing apparatus.

5. The method according to claim 1, wherein the first and second main tube electrodes are provided at upper ends of the first and second main tubes respectively, and each of the branch tube electrodes is provided around an outer circumference portion of the branch tube.

6. The method according to claim 1, wherein each of the energization controls is performed while temperature monitoring is performed at a portion of the tube structure other than corners of the branch tube.

7. The method according to claim 6, wherein the portion other than the corners of the branch tube are identically positioned in the first energizing path and the second energizing path.

8. The method according to claim 6, wherein the portion other than the corners of the branch tube are positioned away from the electrodes of the branch tube by a distance of 100 mm or greater.

9. The method according to claim 6, wherein the energization control for the first energizing path is performed in accordance with a difference in temperature between one of the corners of the branch tube and the portion of the branch tube in the first energizing path, and the energization control for the second energizing path is performed in accordance with a difference in temperature between another one of the corners of the branch tube and the portion of the branch tube in the second energizing path.

10. The method according to claim 1, wherein at least one of the first main tube and the second main tube has a twig-tube portion at an upper section thereof.

11. The method according to claim 10, wherein each of the energization control is performed such that molten glass remaining in upper sections of the first main tube and the second main tube from getting into molten glass in a main flow.

12. The method according to claim 11, further comprising providing a stirrer for at least one of the first main tube and the second main tube.

13. A glass manufacturing method comprising:
a method for electrically energizing and heating a tube structure according to claim 1.

* * * * *